United States Patent

[11] 3,596,447

[72] Inventors Sam Robert Makeham;
Keith Leonard Ruback, both of Bundaberg, Queensland, Australia
[21] Appl. No. 796,843
[22] Filed Feb. 5, 1969
[45] Patented Aug. 3, 1971
[73] Assignee Crichton Industries Pty. Ltd.
Bundaberg, Queensland, Australia

[54] CROP TOPPER
10 Claims, 5 Drawing Figs.
[52] U.S. Cl. ................................................. 56/63, 56/17
[51] Int. Cl. .................................................. A01d 45/02
[50] Field of Search .......................................... 56/63, 56, 15, 16, 17, 18

[56] References Cited
UNITED STATES PATENTS
2,516,277  7/1950  Vichie et al. ............... 56/17
2,648,943  8/1953  Shafer et al. ............... 56/17
3,434,271  3/1969  Gaunt et al. ................ 56/16
3,473,308  10/1969  Zagorski et al. ............ 56/63

Primary Examiner—Russell R. Kinsey
Attorney—Gerhardt, Greenlee & Farris

ABSTRACT: A harvesting machine including a crop-cutting apparatus particularly for cutting the tops off a standing crop. The cutting apparatus includes a pair of rotatable knife discs rotatable on substantially vertical axes and having a slight overlap in cutting area. A pivoted vertically extending guide vane directs cut material toward one knife or the other. A drum is carried above each knife and rotates therewith. The drums have radially extending crop moving paddles thereon. Curved vertically extending guide plates are located to the rear of the drums and intersect at the pivot axis of the guide vane. The knives and drums are individually driven and means are provided to move the guide vane.

Inventors
SAM R. MAKEHAM
KEITH L. RUBACK
By Tweedale & Gerhardt
Attorneys

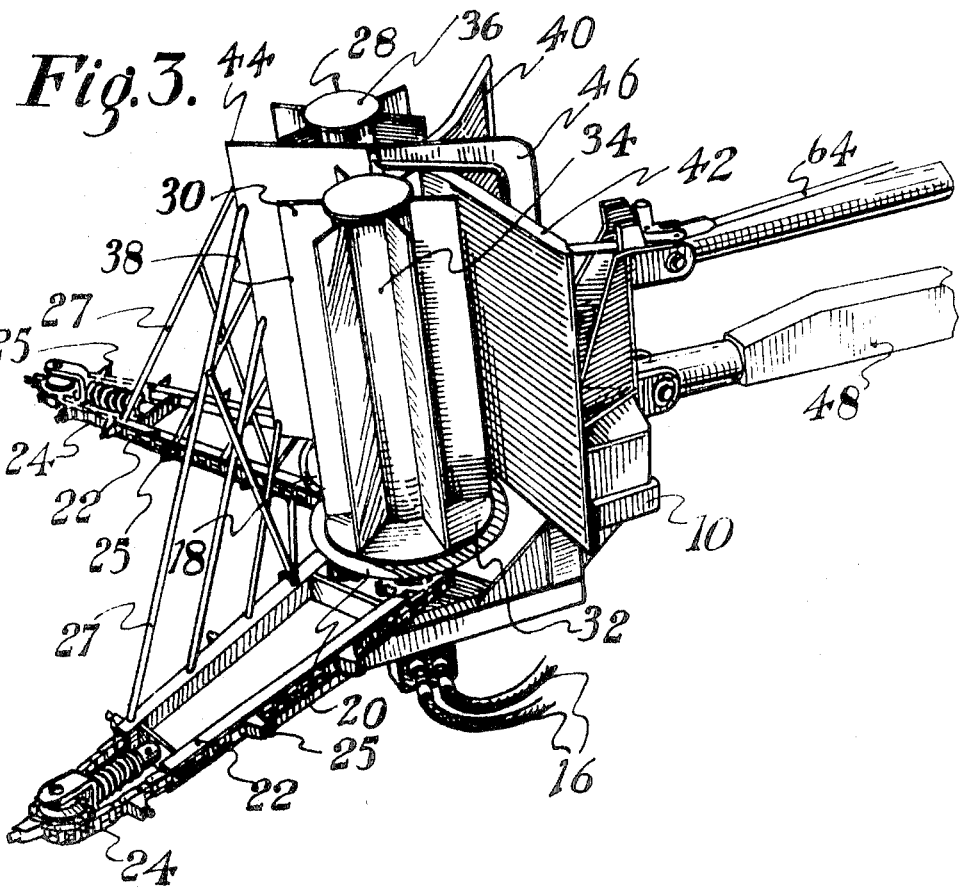
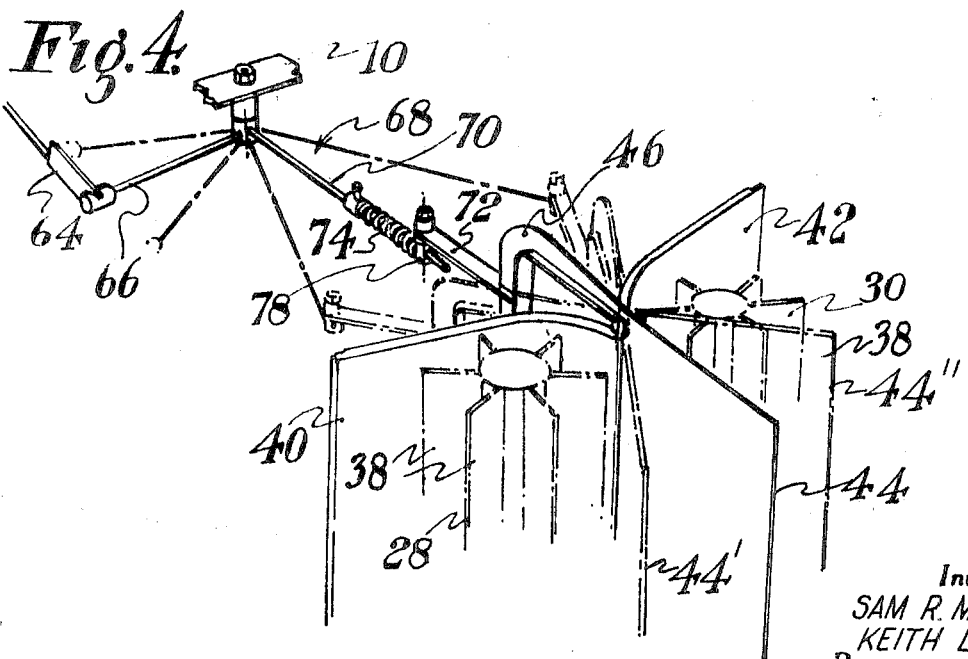

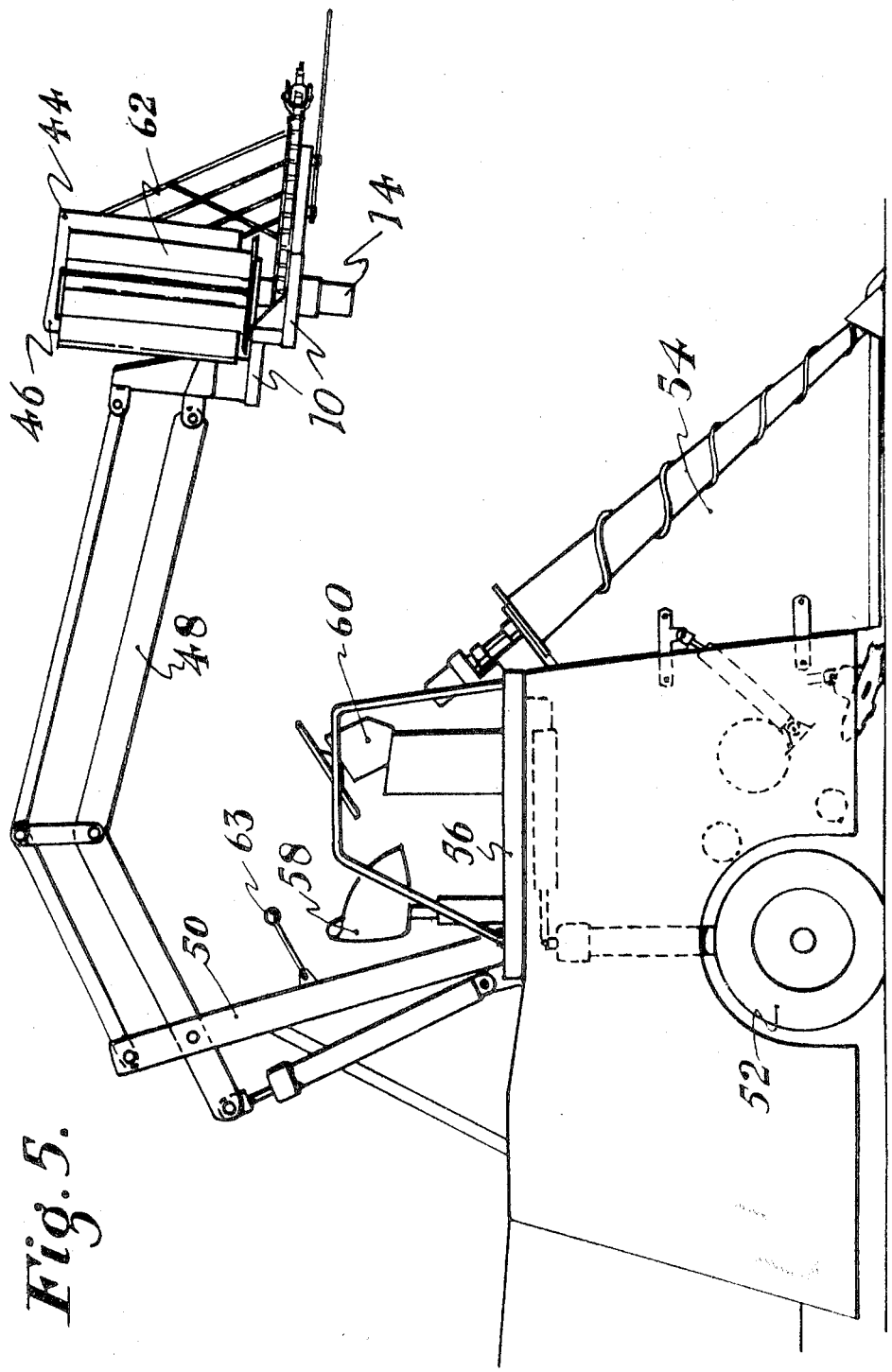

CROP TOPPER

This invention relates to an improved crop-harvesting machine and particularly to a crop cutter or crop topper device for severing waste tops or crop as part of a harvesting operation. The cutter or topper is particularly useful in the harvesting of sugar cane but is not limited thereto.

A widely used method of harvesting sugar and some other tall row crops is to drive the harvester across a field cutting one row of the standing crop, turn the harvester in a headland, and drive it back across the field while cutting the next row of crop. It is undesirable that the cut tops be allowed to be deposited among the uncut rows, and to avoid this they should either be retained by the machine or discharged to the side opposite the working face.

Since the working face may be on either side of the machine it is clear that any discharge means must be adaptable to deliver the tops to either side of the machine at the option of the operator.

There have previously been proposed crop toppers which can operate during movement of the machine, across the working face in either direction but such toppers have had certain disadvantages.

The object of this invention is to provide a crop topper which is simple in construction and satisfactory in operation and which can be readily adjusted to positively deliver tops to either side.

In order that the invention may be more readily understood it will now be described by way of example with reference to a particular embodiment illustrated in the accompanying drawings wherein:

FIG. 3 is a perspective view of the topper.

FIG. 4 is a diagrammatic perspective view illustrating the means by which the guide vane may be moved between its two limiting positions, and FIG. 5 is a side elevational view of the front section of one form of sugar cane harvester illustrating the topper in position thereon.

Figure 1:
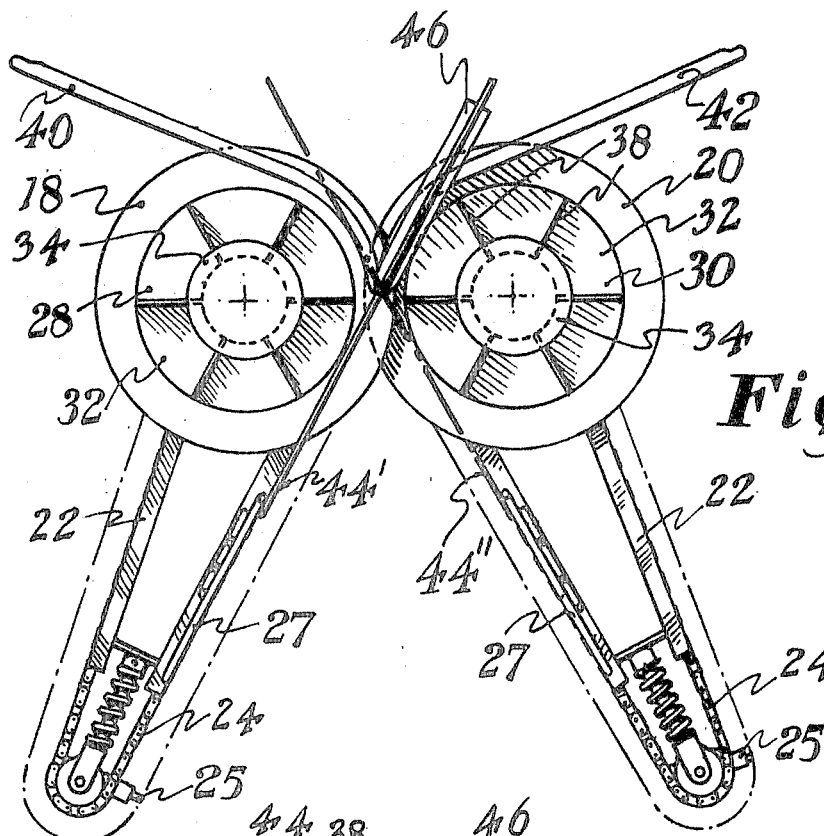
FIG. 1 is a plan view of a topper suitable for use in the harvesting of sugar cane.

The invention provides a crop cutter or topper having a pair of knife discs lying in substantially the same plane and with their axes separated by less than the sum of the radii of the discs, the discs each being rotatable about their axes. Each of the axes passes through a line substantially transverse to the direction of movement of the topper. A guide vane is located between the disc axes and is pivoted between a first position in which cut crop tops are caused to pass to one side of the guide vane and a second position in which cut tops are caused to pass to the other side of the guide vane. The discs are rotated to sever tops from the crop, and positive means are provided to deliver the tops to one side or the other after they are severed by the discs.

Preferably each knife disc has an upwardly directed coaxial drum with a diameter smaller than that of the disc, each said drum being provided with a plurality of outwardly directed radial vanes or paddles which extend axially from a position on or closely adjacent the knife disc to a position at or closely adjacent the top of the drum.

A guide plate is preferably positioned rearwardly, in relation to the direction of motion of the harvester carrying the topper, of the drums and the said guide vane is pivotally supported by said guide plate substantially between the axes of the knife discs.

In a preferred embodiment the knife discs are of the same diameter and the guide plate has two arcuate portions, each of which passes closely adjacent the vanes or paddles of an associated drum so that between the two drums the guide plate extends forwardly to a position in or closely adjacent the common plane of the axes of the discs.

Preferably the guide vane is pivotally connected to the guide plate at or adjacent this position.

The two knife discs are preferably continuously driven in opposite directions of rotation, each disc rotating inwardly as viewed from the front of the machine.

The discs and their associated drums are driven by independent hydraulic motors or by a single hydraulic motor, or the drive may be derived from some other point of the equipment.

Referring now to the figures, the illustrated cutter apparatus or topper includes a frame 10 in which are rotatably mounted a pair of shafts 12 which are driven by individual hydraulic motors 14 connected to the hydraulic system of the harvester by means of respective pairs of hydraulic lines 16.

Each shaft carries a respective top cutting disc 18, 20, the discs being of the same diameter as each other and being arranged in overlapping relationship to ensure complete cutting of the tops. Two arms 22 of frame 10 extend forwardly and outwardly to provide supports for respective gathering chains 24 which are driven by sprockets 26 fixed to shafts 12. To assist in feeding the upper ends of cane stalks to the cutting discs 18, 20, the chains 24 are provided with spaced fingers 25. The chains are tensioned by compression springs acting on the sprockets at their outer ends. Each arm supports an upwardly extending frame 27 which assists in guiding the upper ends of the stalks to the cutter discs.

Bolted, screwed, or otherwise secured concentrically to the top of each cutter disc 18, 20, is a respective drum or turret 28, 30, which comprises a base plate 32, a central hollow tube 34, a cap 36 and a suitable number (in this case six) of outwardly directed radial vanes or paddles 38 which extend axially substantially the full length of each drum or turret. Supported from frame 10 to the rear of the turrets are a pair of guide plates 40, 42, each guide plate extending from a position approximately in the plane containing the axes of rotation of the drums 28, 30, arcuately around the associated turret with a small clearance, and then tangentially outwardly and rearwardly. Pivoted to the most forward point of the guide plates is a guide vane 44 which extends forwardly between the turrets a suitable distance.

A generally U-shaped arm 46 extends rearwardly from the pivot point of guide vane 44 for the purpose of controlling the guide vane as will be hereinafter described.

Frame 10 is mounted on a parallel motion linkage at the forward end of a boom 48 mounted on the frame of a sugar cane harvester 50 as illustrated in FIG. 5. In this figure can be seen the forward end of the harvester and, in particular, one of the pair of the forward wheels 52, the gathering walls 54, the operating platform 56 with seat 58 for the driver and control console 60, boom 48 and the topper 62.

The topper 62 is tilted slightly forwardly and this attitude is maintained as the topper is moved upwardly or downwardly, and forwardly or rearwardly by means of the parallel linkage.

A control lever 63 for guide vane 44 is located on platform 56 within easy reach of the operator and suitable linkage extends forwardly therefrom along the boom 48 to link 64 (see FIGS. 3 and 4) which is pivotally connected to the free end of one arm 66 of a bellcrank lever 68 which is pivotally mounted in a fixed position on frame 10. The other arm 70 of bellcrank 68 has a pivotal and sliding connection with an arm 72 extending rearwardly from arm 46 of guide vane 44.

Operation of control lever 63 in a direction to move link 64 forwardly as seen in FIG. 4 will cause guide vane 44 to move toward turret 28 into the position indicated in dotted lines at 44' in FIG. 4, while operation of control lever 63 in the opposite direction will cause guide vane 44 to move to the position illustrated in dotted lines at 44'' in FIG. 4.

The pivotal and sliding connection between arms 70 and 72 enables these movements to be performed without difficulty, and to ensure that guide vane 44 will remain in its set position, a compression spring 74 is installed on arm 70 between a collar 76 affixed to the arm and post 78 on arm 72 through which arm 70 passes. The present force of spring 74 retains guide vane 44 in either position 44' or 44'' as set by the operator.

In FIG. 1 guide vane 44 is shown in full lines in its position 44' adjacent turret 28 and is indicated diagrammatically in dotted lines in its position 44'' adjacent turret 30. When the harvester is being used to cut a row of cane along a working face adjacent turret 28, guide vane 44 is set by the operator in position 44'. It will be clear that tops cut by discs 18, 20 will be guided by vane 44 into engagement with turret 30 and guide plate 42 and will be positively discharged from the machine on the side opposite the working face.

Similarly when the machine is cutting a row of cane along a working face adjacent turret 30, guide vane 44 may be placed in position 44" to cause the cut tops to be engaged by turret 28 and guide plate 40 so that they are again fed to the side of the machine opposite the working face.

Figure 2:
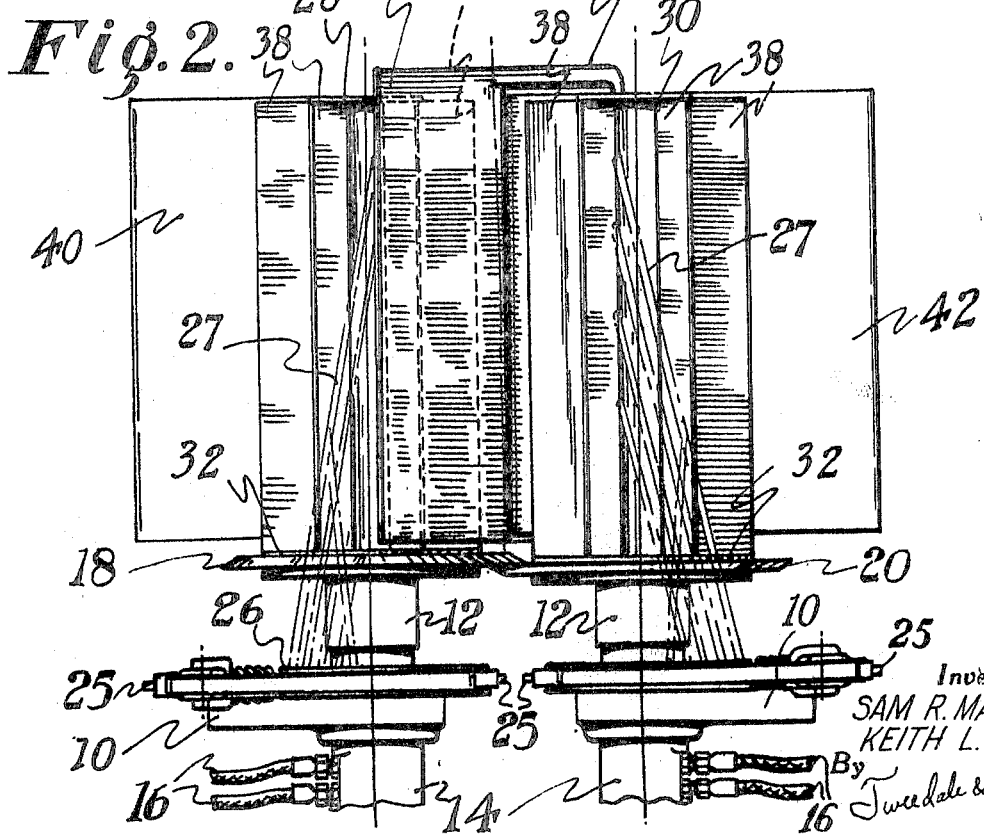
FIG. 2 is a front elevational view of the topper.

In normal cane harvesting practice the tops of the standing stalks are removed before the stalks are severed, at or about ground level, by means of a base cutter. For this reason frame 10 is constructed, as can be seen in FIG. 2, in such manner that it does not obstruct the upper sections of the cane stalks after the tops have been removed, the frame in this area being generally in the form of an inverted U.

In FIG. 5 the topper has been illustrated as attached to a harvester of the shopped cane type, but it will be appreciated that it could be used with equal effect on a whole stick harvester of any type including those having an inclined ramp on which the topper is slidably mounted for height adjustment and those having vertical slideways on which the topper is mounted.

We claim:

1. In a crop-harvesting machine, a cutting apparatus assembly carried by the machine including a pair of rotatable knife discs lying in substantially the same plane and having parallel axes of rotation separated by less than the sum of the radii of the discs, each of the axes of rotation passing through a line substantially transverse to the direction of movement of the cutting apparatus assembly, vertically extending guide vane means located between the disc axes and supported on said assembly for swinging movement between a first position in which material but by the apparatus is caused to pass to one side of the guide vane and a second position in which such material is caused to pass to the other side of the guide vane, means carried by said machine to rotate the discs, and positive deflection means to deliver the material away from the cutting apparatus after it is severed by the discs.

2. The crop-harvesting machine of claim 1 in which each knife disc has an upwardly directed coaxial drum having a diameter smaller than that of the disc, each said drum being provided with a plurality of outwardly directed radial vanes or paddles which extend axially from a position closely adjacent the knife disc to a position closely adjacent the top of the drum.

3. The crop-harvesting machine of claim 2 wherein a material guide plate is positioned rearwardly, in relation to the direction of motion of the harvester carrying the topper, of the drums, and guide vane pivotally supported by said guide plate substantially between the axes of the knife discs.

4. The crop-harvesting machine of claim 3 wherein the knife discs are of the same diameter and the guide plate has two arcuate portions, each of which passes closely adjacent the vanes of an associated drum so that between the two drums the guide plate extends forwardly to a position closely adjacent the common plane of the axes of the discs.

5. The crop-harvester machine of claim 4 wherein the guide vane is pivotally connected to the guide plate at or adjacent the said forward position.

6. The crop-harvester machine of claim 1 wherein the two knife discs are continuously driven in opposite directions of rotation, each disc rotating inwardly as viewed from the front of the machine.

7. The crop-harvester machine of claim 2 wherein the means to rotate discs and their associated drums comprise independent hydraulic motors.

8. The crop-harvester machine of claim 2 wherein said guide vane is moved between its two said positions by means of an overcentering link mechanism, and in which resilient means is provided to retain the guide vane in a selected one of its two positions.

9. A crop-harvester according to claim 2 including a guide plate associated with each of said drums and extending from a position approximately in the plane containing the axes of rotation of the drums, arcuately around the associated drum with a small clearance, and then tangentially outwardly and rearwardly.

10. A crop-harvester machine according to claim 2 including a pair of gathering chains extending forwardly and diverging outwardly and adapted to assist in feeding the crop material to said knife discs.